(12) United States Patent
Gassmann et al.

(10) Patent No.: US 6,824,342 B2
(45) Date of Patent: Nov. 30, 2004

(54) FASTENING ELEMENT WITH A PRESTRESS MEMBER HAVING AN ELASTIC BEARING SURFACE

(75) Inventors: Horst-Detlef Gassmann, Ruggell (LI);
Michael Mergenbaum, Feldkirch (AT);
Werner Wanger, Mauren (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/465,258

(22) Filed: Jun. 19, 2003

(65) Prior Publication Data

US 2004/0001746 A1 Jan. 1, 2004

(30) Foreign Application Priority Data

Jun. 28, 2002 (DE) .......................... 102 29 141

(51) Int. Cl.⁷ ................................ F16B 15/00

(52) U.S. Cl. .................. 411/441; 411/482; 411/533; 411/542

(58) Field of Search ................ 411/440, 441, 411/480, 482, 531, 533, 542

(56) References Cited

U.S. PATENT DOCUMENTS

| | | | |
|---|---|---|---|
| 3,320,845 A | * 5/1967 | Eschweiler | ................. 411/441 |
| 5,569,010 A | 10/1996 | Janssen et al. | |
| 5,624,220 A | 4/1997 | Janssen et al. | |
| 5,671,576 A | * 9/1997 | Kluser | ................. 411/533 X |
| 5,772,381 A | * 6/1998 | Olvera et al. | ................. 411/533 |
| 6,352,398 B1 | 3/2002 | Gonnet | |

FOREIGN PATENT DOCUMENTS

DE            1910723         11/1969

\* cited by examiner

*Primary Examiner*—Neill Wilson
(74) *Attorney, Agent, or Firm*—Sidley Austin Brown & Wood, LLP

(57) ABSTRACT

A fastening element which is designed for driving-in a constructional component, includes a stem (11) adjoined, at it's opposite sides, by a load application section (13) and a tip (12) facing in the setting direction of the fastening element, and a prestress member (20) having a force-introducing section (21) engaging the stem (11) and/or the tip (12), and a bearing surface (22) remote from the load application section (13) and provided with an elastic layer (17) having an opening (18) a wall (19) of which is radially spaced from an axial projection of the stem (11).

5 Claims, 5 Drawing Sheets

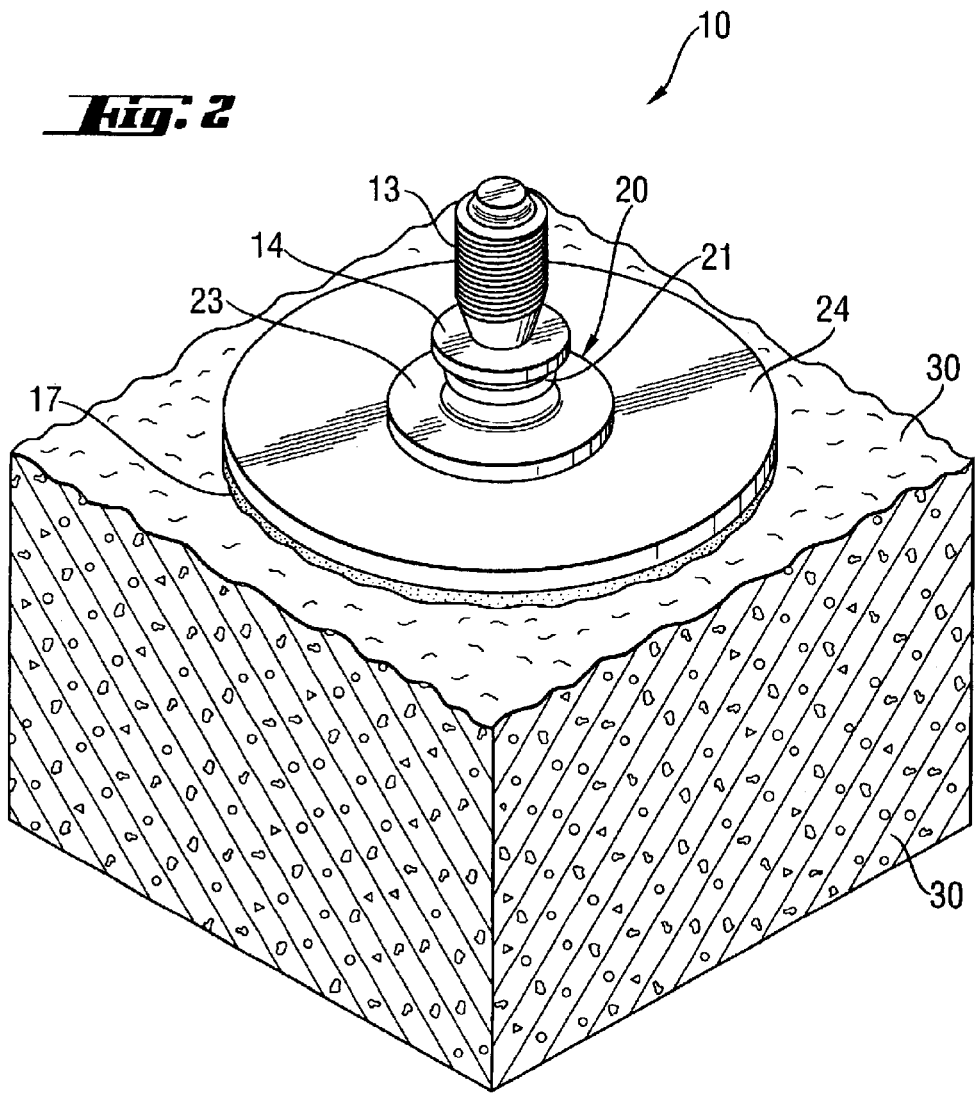

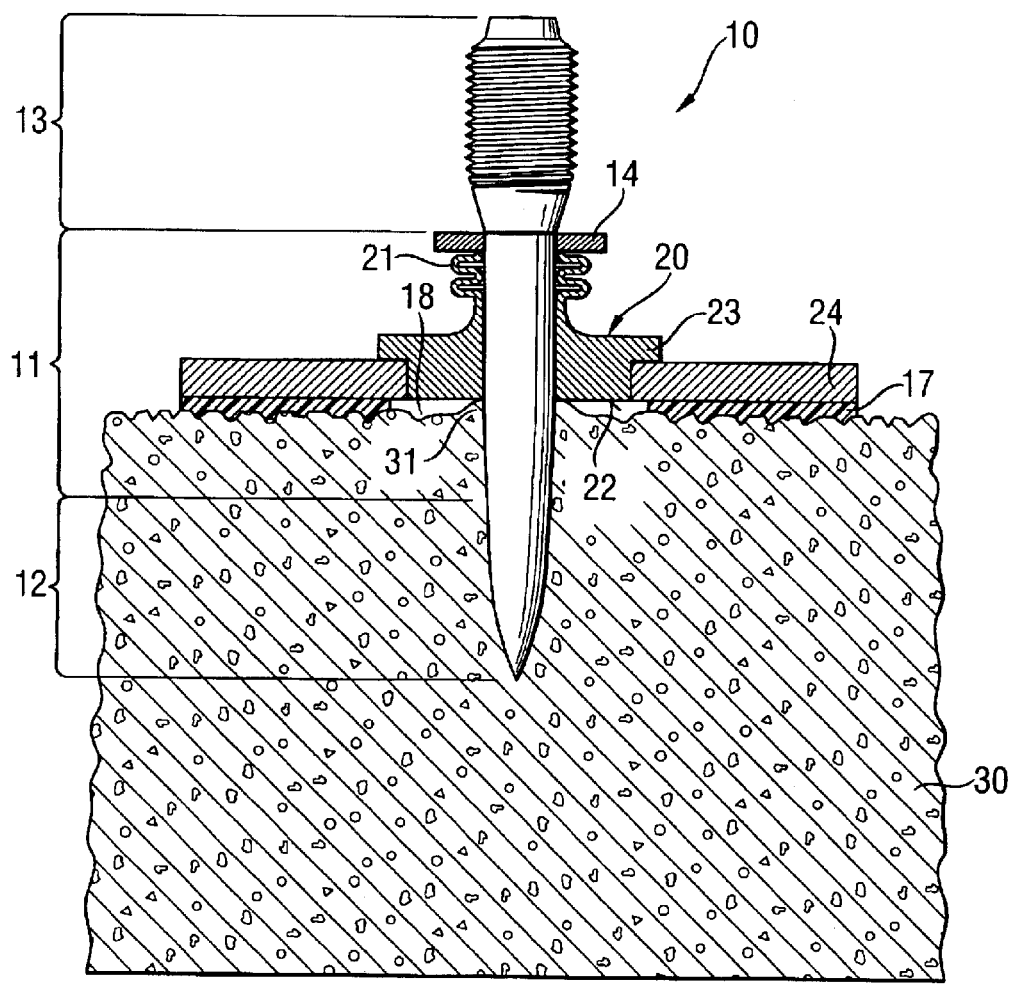

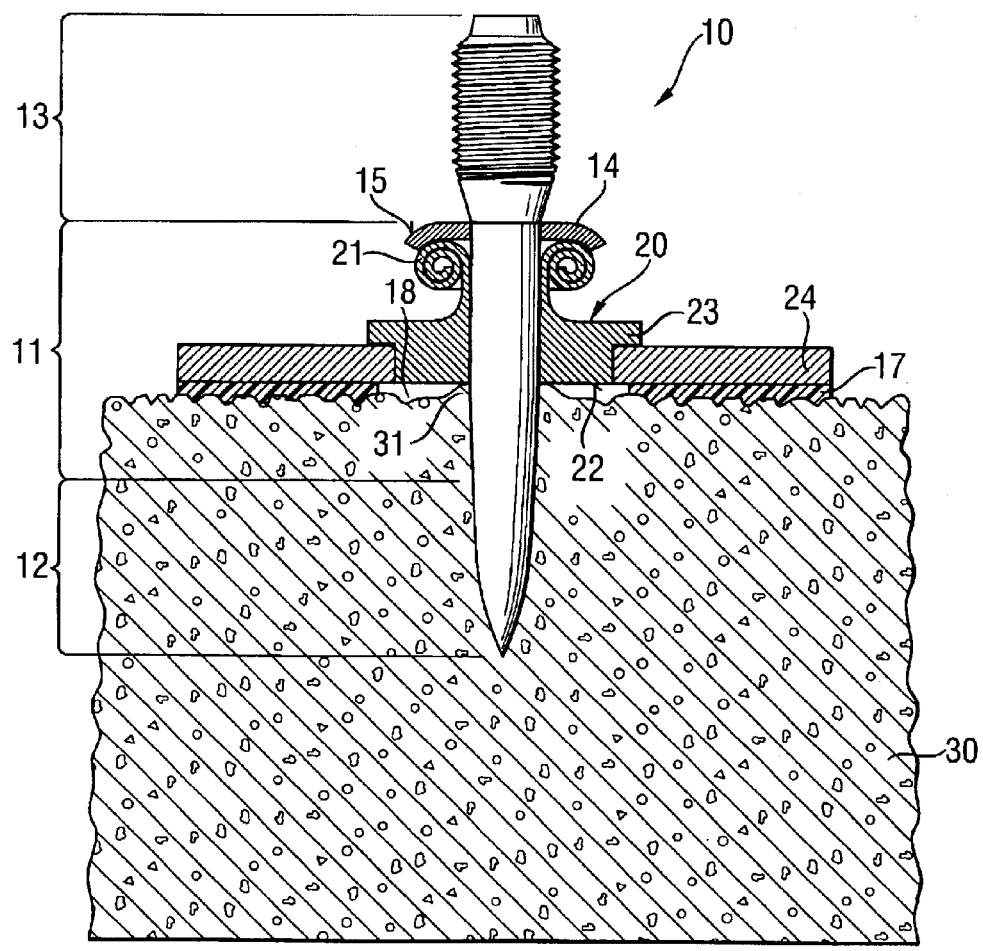

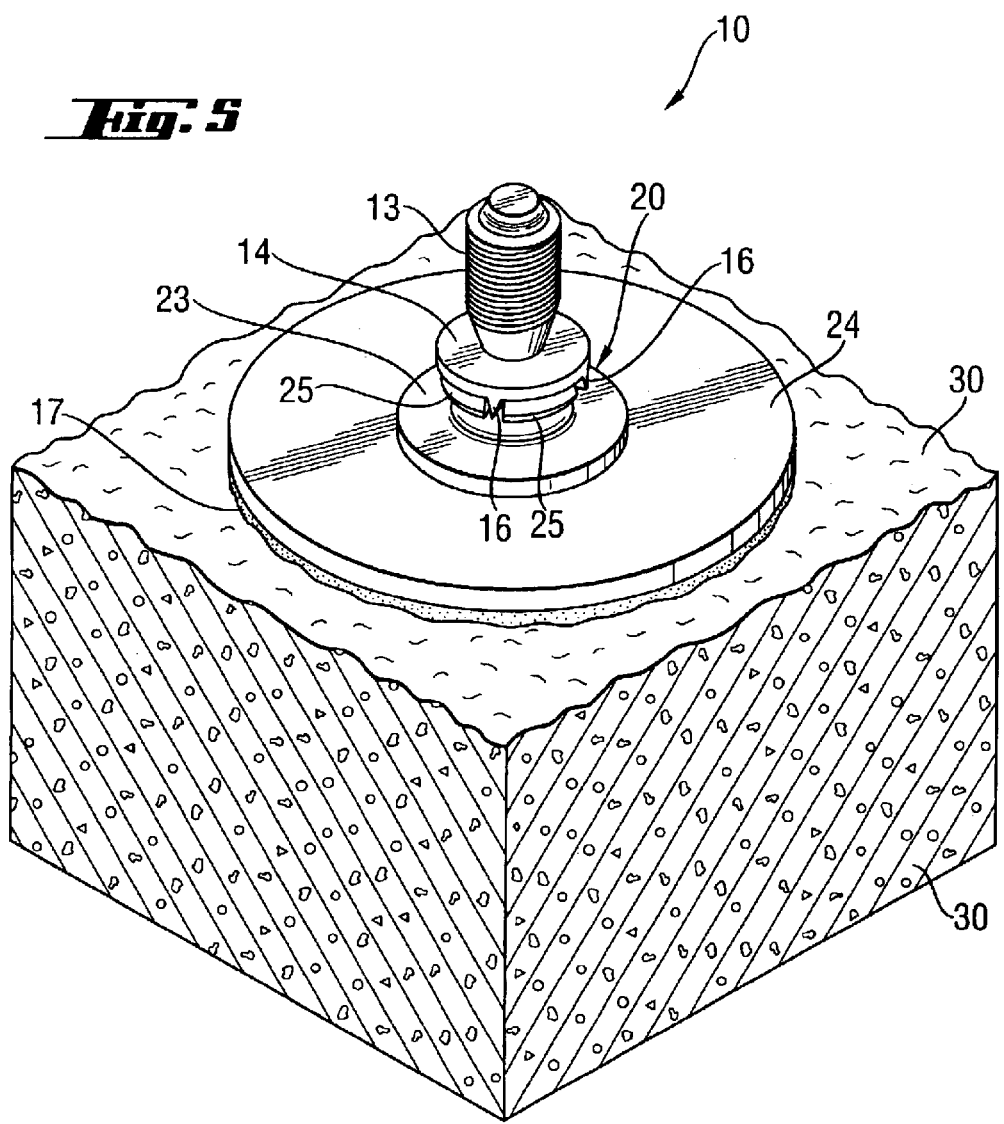

FASTENING ELEMENT WITH A PRESTRESS MEMBER HAVING AN ELASTIC BEARING SURFACE

BACKGROUND OF THE INVENTION

1. Field of the Invention

The present invention relates to a fastening element, such as, bolt, nail, and the like, to be driven in a constructional component formed of a hard material, e.g., concrete, by a high-pressure gas-operated setting tool and including a load application section, a stem adjoining the load application section, a tip adjoining the stem, a prestress member having a force-introducing section engaging at least one of the stem and the tip, and a bearing surface remote from the load application section.

2. Description of the Prior Art

Fastening elements, such as nail, bolts, and the like and which are made of steel, are used for securing objects to constructional components formed, e.g., of concrete or stone. A fastening element has a stem with a usually narrowing tip, and a load application section provided at the end of the fastening element remote from the tip. The load application section can be formed, e.g., as a threaded section or a head. The setting process is effected, e.g., with an explosive charge-operated or gas-operated setting tool. During a setting process, the fastening element, when reaching, e.g., concrete, often causes chipping-off of the concrete or formation of cracks therein. This damage results in that the setting process needs to be repeated with increased operational costs and/or chipped-off areas and cracks should be treated and, in case of an exposed concrete, covered.

German Publication De-44 32 783 A1 discloses a fastening element, a nail or bolt with a prestress element being surrounded with another element formed of a plastic material for increasing the bearing surface over which the fastening element is supported on a constructional component. The introduction of forces is effected over a sleeve section of the prestress element in which, in the initial position of the fastening element, the tip of a nail, a bolt or the like is located.

German Publication DE-19 10 723 discloses a fastening element, nail, bolt, in which a metal washer is arranged on the stem rearwardly, with respect to the setting direction, of a disc of an elastic material. The disc has a diameter smaller than the stem diameter, so that the press-on effect is somewhat small during the setting process.

The drawback of the known fastening elements consists in that, on one hand, with uneven surfaces of the constructional component, cracks often are formed during the setting process and, on the other hand, the fastening element does not tightly abut the constructional component because of arching of the component during the setting process. As a result, a gap is formed between the bearing surface and the constructional component.

Accordingly, an object of the present invention is a fastening element in which the drawbacks of the conventional fastening elements are eliminated and the failure rate of the setting process is substantially reduced.

SUMMARY OF THE INVENTION

This and other objects of the present invention, which will become apparent hereinafter, are achieved by providing on the bearing surface of the prestress member an elastic or compressible layer which during and after the setting process, is located between the bearing surface and the constructional component. In the middle of the layer, there is provided an opening the diameter of which is greater than the diameter of the stem of the fastening element and, preferably, greater than the diameter of flange-shaped bearing section of the prestress member. During the setting process, the elastic layer provides for an optimal transmission of the setting energy to the surface surrounding the setting point even with a rough and uneven surface of the constructional component. As a result no chipping-off occurs. The radial spacing of the elastic layer from the setting axis or from the stem of the fastening element and the central opening therein provide for a free space into which during the setting process; the material, which is produced during the setting process, can flow. With the present invention, lifting of the fastening element and/or gap formation between the bearing surface and the constructional component is prevented. Prevention of lifting of the fastening element off and prevention of the gap formation were established during comparative tests of the inventive fastening element and a conventional one.

It is advantageous when the bearing surface is formed of two elements the end surfaces of which facing in the setting direction, lie in the same plane. The two elements can be formed by a flange-shaped bearing section of the prestress member and a bending-resistant disc surrounding the bearing section. The bending-resistant disc can be formed, e.g., of metal and can be provided in order to increase its stiffness, with a circumferential edge arch and/or with beads provided on the surface of the disc facing in a direction opposite to the setting direction. The disc can have the side thereof facing in the direction opposite the setting direction, formed as a bell or a plate.

The formation of the bearing surface by two separate parts permits to reduce manufacturing costs of the prestress member. However, the prestress member and the disc can be formed as a one-piece part.

Advantageously, a metal washer is arranged on the stem of the fastening element rearwardly, with respect to a setting direction of the fastening element; of the force-introducing section of the prestress member. During the setting process, the metal washer is displaced against the force-introducing section, which is formed as a sleeve, folding the same.

The metal washer can be provided with an arch-shaped circumferential edge section During the setting process, the arch-shaped section of the metal washer splices and rolls up the sleeve-shaped force-introducing section so that the later is almost completely folded on is rolled up, which permits to obtain a maximum possible setting depth of the fastening element. This positively affects the force/time behavior of the fastening element.

Advantageously, the metal washer is provided, on its side facing in the setting direction, with one or more cutting elements which splice the sleeve-shaped, force-introducing section in several parts during the setting process. The splicing of the force-introducing section leads to a more rapid folding or rolling-up of this section, which further increases the setting depth of the fastening element.

The novel features of the present invention, which are considered as characteristic for the invention, are set forth in the appended claims. The invention itself, however both as to its, construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 2 a perspective view of the fastening element shown in FIG. 1 in its inserted into a constructional component condition;

FIG. 3 a cross-sectional view of the fastening element shown in FIG. 1 in its inserted into a constructional component, condition;

FIG. 4 a cross-sectional view of a fastening element according to a second embodiment of the present invention in its inserted into a constructional component, condition; and FIG. 5 a perspective view of a fastening element according to a third embodiment of the present invention in its inserted into a constructional component, condition.

DETAILED DESCRIPTION OF THE PREFERRED EMBODIMENT

Figure 1:
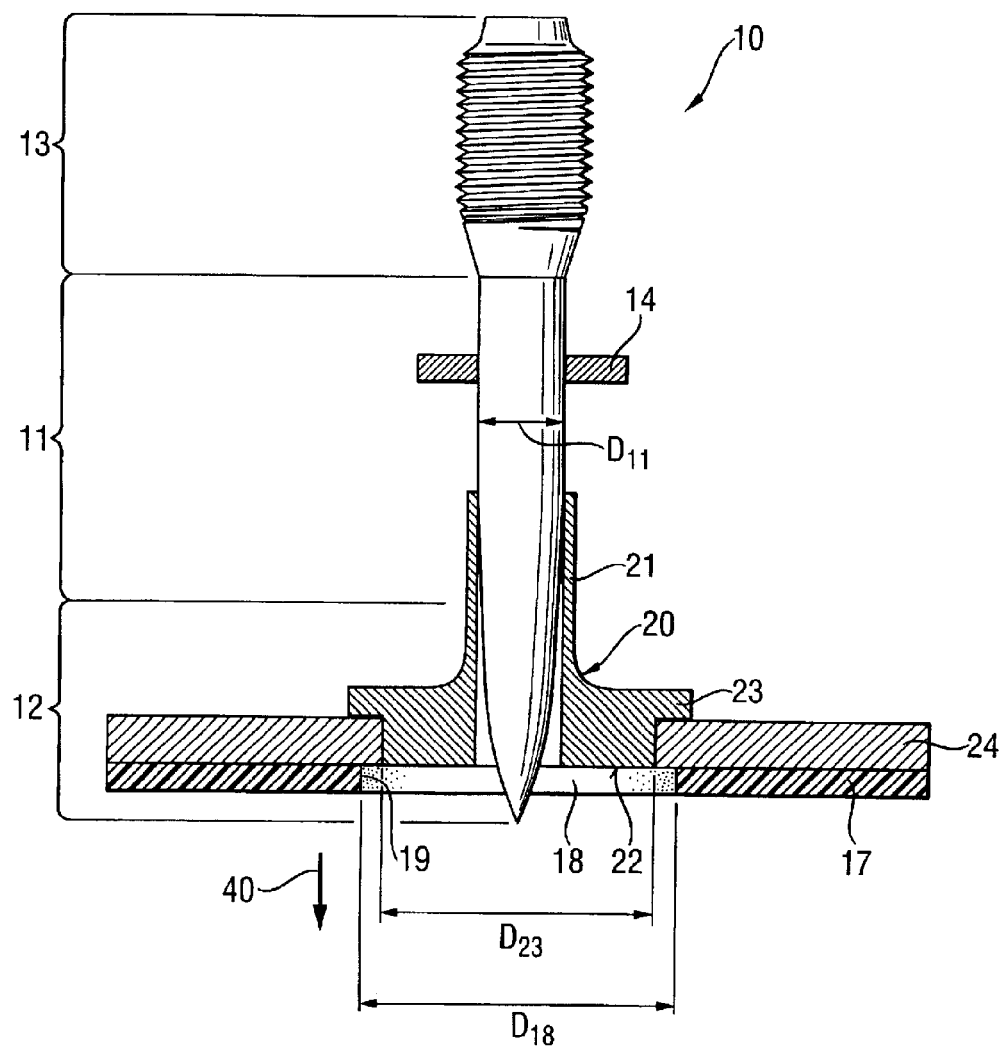
FIG. 1 a cross-sectional view of a first embodiment of a fastening element according to the present invention.

A fastening element 10 according to the present invention, a first embodiment of which is shown in FIGS. 1–3, has a load application section 13 which is formed as a threaded section in the embodiment shown in the drawings. The load application section can also be formed as a plain nail head. In the setting direction 40 of the fastening element 10, the load application section is adjoined by a stem 11 having an outer diameter $D_{11}$. At the end of the fastening element 10 facing in the setting direction 40, there is provided a tip 12.

A metal washer 14, in particular in form of a disc, is provided in the approximately middle portion of the stem 11. The metal washer 14 can be pinned on or pressed on the stem 11. A prestress member 20 is provided on the fastening element 10. The prestress member 20 extends over a portion of the stem 11 and over the tip 12. The prestress member 20 has a force-introducing section 21, which is formed as a sleeve section, a flange-shaped bearing section 23, and a bearing washer 24. In the embodiment shown in FIGS. 1–3, the flange-shaped bearing section 23 and the bearing washer 24 are formed as separate parts which a subsequently assembled together. However, the flange-shaped bearing section 23 and the bearing washer 24 can be formed as an integral one-piece part. The surfaces of the bearing section 23 and of the bearing washer 24 form a bearing surface 22 of the prestressed member 20. The bearing surface 22 supports the fastening element 10 and the prestress member 20 on a constructional component 30.

In the setting direction 40, and elastic layer 17 precedes the bearing surface 22. The elastic layer 17 has an opening 18 which is limited by an outer wall 19 and has a diameter $D_{18}$. In the embodiment shown in FIGS. 1–3, the diameter $D_{18}$ of the opening 18 is somewhat larger than the diameter $D_{23}$ of the bearing section 23. The diameter $D_{18}$ of the opening 18 is in several times larger than the diameter $D_{11}$ of the stem 11 of the fastening element 10.

When the inventive fastening element 10 is driven into the constructional component 30 with a setting tool (no shown), there is formed, in the constructional component 30 (see FIG. 3) at the setting point, an arch 31 extending into the opening 18 of the elastic layer 17. The elastic layer 17 that, e.g., is formed of an elastic or compressible plastic material or of elastic and compressible foam, e.g., neoprene, permits to compensate the unevenness of the constructional component 30 during the setting process. The elimination of the unevenness provides for a uniform introduction of forces by the prestress member 20 into the constructional component 30. During the setting process, the bearing or force-introducing section 21 is folded by the metal washer 14, as shown in FIG. 3. While folding the bearing section 21, the metal washer 14 becomes displaced by a certain amount in a direction opposite to the setting direction 40 up to the load application position 13.

FIG. 4 shows a second embodiment of a fastening element 10 according to the present invention. The fastening element 10 shown in FIG. 4 differs from that in FIGS. 1–3 in that the metal washer 14 has a circumferential edge arch 15 that provides for curling of the bearing sleeve-shaped section 21 during the setting process, as shown in FIG. 4. This permits to drive the fastening element 10 further in the constructional component.

In the embodiment of a fastening element 10 shown in FIG. 5, cutting elements 16 are provided on the bottom of the metal washer 14. During the setting process, the cutting elements 16 cut the sleeve-shaped section 21 in two or more segments, which provides for further penetration of the fastening element 10 into the constructional component 30.

The present invention is not limited to the disclosed embodiment. Thus, the bearing washer can be provided with stiffness-increasing elements such as beads, seams, folds, etc . . . The bearing washer can be formed as a bell-shaped part.

The bearing washer and/or the prestress member can be formed of metals having different stiffness, plastic material, metalloplastics, fiber-reinforced plastic material, etc . . .

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the append claims.

What is claimed is:

1. A fastening element to be driven in a constructional component formed of a hard material, the fastening element comprising a load application section (13); a stem (11) adjoining the load application section (13); a tip (12) adjoining the stem (11); a prestressed member (20) having a force-introducing section (21) engaging at least one of the stem (11) and a tip (12), and a bearing surface (22) remote from the load application section (13); and an elastic layer (17) provided on the bearings surface (22) of the prestress member (20) and having an opening (18) a wall (19) of which is radially spaced from an axial projection of the stem (11).

2. A fastening element according to claim 1, wherein the prestress member (20) comprises a flange-shaped bearing section (23) and a bearing washer (24), and wherein the bearing surface is formed by bottom surfaces of the flange-shaped bearing section (23) and the bearing washer (24).

3. A fastening element according to claim 1, further comprising a metal washer (14) arranged on the stem (11) of the fastening element (10) rearwardly, in a setting direction (40) of the fastening element (10), of the force-introducing section (21) for folding the force-introducing section (21) during a setting process.

4. A fastening element according to claim 3, wherein the metal washer (14) has an arch-shaped circumferential edge section (15) arched in a direction opposite the setting direction (40) of the fastening element (10).

5. A fastening element according to claim 3, wherein the metal washer (14) has at least one cutting element (16) provided on a side of the metal washer (14) facing in the setting direction (40) of the fastening element (10).

* * * * *